United States Patent
Kershaw et al.

(10) Patent No.: US 7,949,835 B2
(45) Date of Patent: May 24, 2011

(54) DATA PROCESSING APPARATUS AND METHOD FOR CONTROLLING ACCESS TO MEMORY

(75) Inventors: Daniel Kershaw, Cambridge (GB); Donald Felton, Ely (GB); Ashley Miles Stevens, Cambridge (GB); Anthony Paul Thompson, Cambridge (GB)

(73) Assignee: ARM Limited, Cambridge (GB)

( * ) Notice: Subject to any disclaimer, the term of this patent is extended or adjusted under 35 U.S.C. 154(b) by 1190 days.

(21) Appl. No.: 11/230,498

(22) Filed: Sep. 21, 2005

(65) Prior Publication Data

US 2006/0179259 A1 Aug. 10, 2006

(30) Foreign Application Priority Data

Feb. 4, 2005 (GB) .................................. 0502381.7

(51) Int. Cl.
*G06F 12/00* (2006.01)

(52) U.S. Cl. ......... 711/147; 711/156; 711/163; 711/170

(58) Field of Classification Search ........................ None
See application file for complete search history.

(56) References Cited

U.S. PATENT DOCUMENTS

| | | | |
|---|---|---|---|
| 5,740,400 | A | 4/1998 | Bowles |
| 6,321,258 | B1 | 11/2001 | Stollfus et al. |
| 7,065,630 | B1 * | 6/2006 | Ledebohm et al. ........... 711/206 |
| 2002/0069327 | A1 | 6/2002 | Chauvel |
| 2002/0069339 | A1 | 6/2002 | Lasserre et al. |
| 2005/0081182 | A1 * | 4/2005 | Minor et al. .................. 717/100 |

FOREIGN PATENT DOCUMENTS

| | | |
|---|---|---|
| EP | 0 382 237 | 8/1990 |
| EP | 1 067 461 | 1/2001 |
| EP | 1 139 222 | 10/2001 |
| JP | 2001-51958 | 2/2001 |
| JP | 2001-290706 | 10/2001 |

OTHER PUBLICATIONS

United Kingdom Search Report for GB 0502381.7 dated Jun. 20, 2005.
English translation of Japanese Office Action mailed Feb. 1, 2011 in JP 2005-273044.
Japanese Office Action and List of Cited references mailed Feb. 1, 2011 in JP 2005-273044.

* cited by examiner

*Primary Examiner* — Shawn X Gu
(74) *Attorney, Agent, or Firm* — Nixon & Vanderhye P.C.

(57) ABSTRACT

A data processing apparatus and method are provided for controlling access to memory. The data processing apparatus comprises main processing logic operable to execute a sequence of instructions in order to perform a process, and subsidiary processing logic operable to perform at least part of the process on behalf of the main processing logic. A memory is provided that is accessible by the main processing logic when performing the process, the main processing logic defining a portion of the memory to be allocated memory accessible to the subsidiary processing logic when performing part of the process on behalf of the main processing logic. Further, a memory management unit is provided that is programmable by the main processing logic and operable to control access to the allocated memory by the subsidiary processing logic. The main processing logic is arranged to program the memory management unit such that for an access request issued by the subsidiary processing logic relating to the allocated memory, the memory management unit produces a memory address and one or more associated memory attributes identifying one or more properties of the allocated memory at that memory address.

18 Claims, 7 Drawing Sheets

DATA PROCESSING APPARATUS AND METHOD FOR CONTROLLING ACCESS TO MEMORY

BACKGROUND OF THE INVENTION

1. Field of the Invention

The present invention relates to a data processing apparatus and method for controlling access to memory.

2. Description of the Prior Art

As data processing tasks increase in complexity, it is becoming more common for data processing systems to include more than one processing unit to handle the performance of these tasks or processes. In particular, in addition to main processing logic, for example a central processing unit (CPU), it is often the case that a number of additional pieces of special purpose hardware logic are provided for performing particular tasks. Examples of such additional pieces of hardware are hardware accelerators such as those used to perform certain video processing functions, digital signal processors (DSPs), etc.

To enable such additional hardware logic to undertake certain tasks on behalf of the main processing logic, it is clear that those additional hardware units must be given access to the required data sets that need processing. Currently, this is done by arranging the main processing unit to share a certain portion of memory with the relevant additional hardware logic units, and typically this is achieved by reserving a pool of contiguous, physically addressed memory at boot-up time. However, as the data sets to be processed increase in size, the likelihood of providing more additional special purpose hardware units such as accelerators increases, but certain hardware units may be used only infrequently and hence it becomes undesirable to reserve the large amount of memory required for such processes that a user of the system may only use relatively infrequently. For example, VGA H.264 requires 3 Mbytes for a picture buffer, and a 5 Megapixel camera requires 15 Mbytes for an RGB processed image.

With this in mind, it is becoming impractical to reserve a pool of contiguous, physically addressed memory at boot-up time for the sharing of data between the main processing logic and the additional processing logic, and accordingly this has driven the need to share memory from the operating system managed dynamic memory pool. As such memory is typically virtually addressed, this requires management of the virtual to physical address translation process to ensure that the correct data is accessed by the additional hardware when performing a task on behalf of the main processing logic.

With regard to the portion of memory to be shared, the complex operating systems that exist today generally make very poor use of static on-chip memory, and applications which wish to take advantage of this memory must be specifically linked and managed to do so. This hence makes static on-chip memory a poor candidate for use as the memory to be shared between the main processing logic and the additional hardware logic units for the earlier-described purposes. One possible alternative approach is to consider developing a level of cache which could be shared between the main processing logic and any other required hardware logic, but typical systems often have multiple levels of caches, and such an approach would give rise to some cache coherency issues that would need addressing. For example, it needs to be ensured that both the main processing logic and the additional hardware logic see the same data when they make a particular access.

Additionally, in multi-processing systems, system level security issues can arise if data is to be shared between various pieces of processing logic. For example, the main processing logic may be arranged to handle both secure/trusted data and non-secure/non-trusted data. If certain tasks are to be delegated to an additional piece of hardware logic, then it is possible that some trusted data will need to be shared, whilst other trusted data will be private to the particular processor. This means that in such situations any simple bus master aware decoding techniques used to police accesses to memory to ensure that non-secure processes do not access secure data, will be too limiting, and accordingly in such situations it would be necessary to provide techniques which would enable access to the trusted data to be correctly policed.

Accordingly, it would be desirable to provide a technique which enables memory to be shared between the main processing logic and one or more additional pieces of processing logic to enable certain tasks to be delegated to the additional processing logic on behalf of the main processing logic, but which alleviates the concerns outlined above.

SUMMARY OF THE INVENTION

Viewed from a first aspect, the present invention provides a data processing apparatus, comprising: main processing logic operable to execute a sequence of instructions in order to perform a process; subsidiary processing logic operable to perform at least part of said process on behalf of the main processing logic; a memory accessible by the main processing logic when performing said process, the main processing logic being operable to define a portion of said memory to be allocated memory accessible to the subsidiary processing logic when performing said at least part of said process; a memory management unit programmable by the main processing logic and operable to control access to the allocated memory by the subsidiary processing logic, the main processing logic being operable to program the memory management unit such that for an access request issued by the subsidiary processing logic relating to the allocated memory, the memory management unit is operable to produce a memory address and one or more associated memory attributes identifying one or more properties of the allocated memory at that memory address.

In accordance with the present invention, the main processing logic can define a portion of memory to be allocated memory accessible by the subsidiary processing logic, and a memory management unit is provided for controlling access to the allocated memory by the subsidiary processing logic. Further, in accordance with the present invention, the memory management unit is programmable by the main processing logic. This programming is performed such that for an access request issued by the subsidiary processing logic relating to the allocated memory, the memory management unit produces not only a memory address, but also one or more associated memory attributes identifying one or more properties of the allocated memory at that memory address. By causing the memory management unit to output such memory attributes dependent on how it has been programmed by the main processing logic, this enables access to the allocated memory to be handled in a consistent manner system wide.

In particular, by this approach it can be ensured that when the subsidiary processing logic is performing part of the process on behalf of the main processing logic, an access request issued by the subsidiary processing logic and routed via the memory management unit will result in memory attributes being associated with that access request which are controlled by the main processing logic.

Hence, by way of example, considering some of the earlier-described problems with prior art techniques, it can be seen that if the allocated memory is cacheable memory and a cache is shared between the main processing logic and the subsidiary processing logic, the memory management unit can be arranged to issue memory attributes associated with an access request issued by the subsidiary processing logic, with those memory attributes identifying how the cache should handle data the subject of the access request. Similarly, considering a system where both secure and non-secure data are handled, the memory management unit can be arranged to provide a memory attribute in association with an access request issued by the subsidiary processing logic that identifies a security level required to access the memory location identified by the memory address of the access request.

It will be appreciated that the generation of other relevant memory attributes can be controlled in a similar manner. In each case, the memory management unit is programmed by the main processing logic such that the memory attributes produced by the memory management unit in association with the access request issued by the subsidiary processing logic are produced under the control of the main processing logic.

The term memory as used herein is intended to cover not only memory devices such as cache and RAM, but also other parts of system memory, for example registers of a memory mapped peripheral.

The allocated memory may be allocated solely to the subsidiary processing logic whilst it performs a task on behalf of the main processing logic. However, in one embodiment, the allocated memory is shared memory accessible by both the main processing logic and the subsidiary processing logic.

The memory management unit may be programmed by the main processing logic in a variety of ways. However, in one embodiment, the main processing logic is operable to produce a set of tables, each table in the set containing a number of descriptors, each descriptor defining for an associated address range access control information from which said address and one or more associated memory attributes can be derived, the main processing logic being further operable to program the memory management unit to identify the location of the set of tables and circumstances in which each table should be used.

Hence, by such an approach, for any valid access request received by the memory management unit, the memory management unit will be able to identify an appropriate table, and from that table will be arranged to identify the relevant descriptor containing the required information to enable the associated memory attributes to be derived. Typically a particular descriptor is selected from a chosen table based on a memory address specified in the access request issued by the subsidiary processing logic. In one embodiment, the address specified by the access request is a virtual address, and this virtual address is used in determining the appropriate descriptor. The descriptor will typically provide access control information which not only enables the one or more associated memory attributes to be derived, but also enables the virtual address to be converted into a physical address for outputting to memory.

In one embodiment, the main processing logic is operable to perform a plurality of processes, and the set of tables comprises a table for each process that the subsidiary processing logic may perform a part of on behalf of the main processing logic. It will be appreciated that it is not necessarily the case that a separate table will be produced for each such process, since in some embodiments some processes may share a particular table.

By associating each process with a table, descriptors applicable to particular processes can be defined, and accordingly the associated memory attributes output by the memory management unit in association with an access request will vary dependent on the process being performed by the subsidiary processing logic on behalf of the main processing logic.

In one particular embodiment, the subsidiary processing logic is operable to perform at least part of multiple processes on behalf of the main processing logic, and in association with an access request issued by the subsidiary processing logic the memory management unit is operable to receive an indication of the process to which the access request relates, the memory management unit being operable to select based on said indication one of said tables from the set.

In one embodiment, the subsidiary processing logic may be arranged to output a device identifier to the memory management unit in association with an access request to identify that the access request comes from that particular subsidiary processing logic. When there is only one process that may be allocated to that subsidiary processing logic, this device identifier will be sufficient to identify the particular table from which the descriptor should be obtained. However, where that subsidiary processing logic may perform multiple processes on behalf of the main processing logic, the device identifier is not sufficient in itself to enable the appropriate table to be selected. Hence, in one embodiment the device identifier is altered by the subsidiary processing logic so as to include additional information identifying the particular process to which the access request relates. In an alternative embodiment, rather than modifying the device identifier, a separate signal indicating the process to which the access request relates is provided to the memory management unit, either by the subsidiary processing logic or by the main processing logic.

In one embodiment, to ensure the integrity of the system, the memory management unit is programmed by the main processing logic when operating in a privileged mode. Further, in embodiments where the set of tables are used, these tables are also produced by the main processing logic when operating in a privileged mode.

In one embodiment, the allocated memory is cacheable memory, and the data processing apparatus further comprises a cache accessible by the main processing logic and the subsidiary processing logic and operable to store data associated with cacheable memory, the one or more associated memory attributes produced by the memory management unit comprising a cache attribute identifying how the cache should handle data the subject of the access request. Since the generation of the cache attribute by the memory management unit is controlled by the way in which that memory management unit is programmed by the main processing unit, system level cache coherency between the subsidiary processing unit and the main processing unit can be ensured, thereby ensuring that both the main processing logic and the subsidiary processing logic have the same view of memory at any point in time.

In one particular embodiment, the cache is one of a plurality of different levels of cache provided within the data processing apparatus, and the cache attribute identifies for each level of cache how that level of cache should handle data the subject of the access request. Hence, the cache attribute may define independently for various levels of cache how those levels of cache should handle the data. Accordingly, by way of example, the cache attribute may identify that one level of cache should apply a "write through" policy to the data (where at the time the cache is updated that update is also propagated on to a further level of cache or to memory), whilst another level of cache may adopt a "write back" policy with respect to that data (where at the time the cache is updated the update is not propagated on, but instead is only propagated on when the cache line is ultimately evicted from the cache).

In one particular embodiment, the plurality of different levels of cache are grouped into inner cache and outer cache, and the cache attribute identifies for the inner cache and for the outer cache how that cache should handle data the subject of the access request. The grouping of caches into inner and outer cache provides a convenient mechanism to abstract the control of an arbitrary cache hierarchy for software running on the main processing engine for such processes as cache cleaning, flushing and coherence. Precisely which caches in a hierarchy are selected as inner or outer cache is implementation dependent. By definition, the caches which are closest to the main processing engine in the hierarchy are referred to as the inner caches, whilst those furthest away are referred to as the outer caches.

In one embodiment, to ensure system level cache coherency between the main processing logic and the subsidiary processing logic, the cache attribute may identify that the inner cache should apply a write through policy to the data and the outer cache should apply a write back policy to the data. This will ensure that any update to the data by either processing logic will immediately be replicated within the outer cache.

In one embodiment, a plurality of different security levels are defined and the one or more memory attributes associated with the memory address comprises a protection attribute identifying the security level required to access the memory location identified by that memory address. In one embodiment, the security levels may be associated with particular operating modes, such as user mode, privileged mode, etc. However, in an alternative embodiment, the security levels relate not only to different modes of operation but also to different security domains of operation. More particularly, in one embodiment, the main processing logic is operable in a plurality of modes and a plurality of domains, said plurality of domains comprising a secure domain and a non-secure domain, said plurality of modes including at least one non-secure mode being a mode in the non-secure domain, and at least one secure mode being a mode in the secure domain, said main processing logic being operable such that when executing a program in a secure mode said program has access to secure data which is not accessible when said main processing logic is operating in a non-secure mode, and said security levels being defined with respect to the plurality of modes and plurality of domains.

In such embodiments, if an application is loaded on to the data processing apparatus, it will by default be executed in the non-secure domain. In contrast, the secure domain is only used for certain specific secure functions, and hence is only used to run certain secure applications. Hence, the presence of the secure domain and the non-secure domain in effect defines two different worlds within the device, namely a secure world in which certain key secure functions are performed and a non-secure world in which all other applications are run. In such embodiments, processing units in the system can be arranged to issue a domain signal in association with a memory access request specifying which domain the memory access request pertains to, and this domain signal can be used to determine whether an access defined by the particular memory access request should in fact be allowed to proceed. In accordance with one embodiment of the present invention, the protection attribute produced by the memory management unit for access requests issued by the subsidiary processing logic takes the form of such a domain signal.

In one particular embodiment, in said at least one non-secure mode the main processing logic is operable under the control of a non-secure operating system and in said at least one secure mode the main processing logic is operable under the control of a secure operating system, the secure operating system being operable to produce the set of tables, and program the memory management unit, when the main processing logic is operating in a privileged secure mode. This hence ensures that the programming of the memory management unit and the production of the set of tables referenced by the memory management unit, takes place in the secure world, and accordingly cannot be tampered with by applications operating in the non-secure world.

Whilst in some embodiments there may be only a single subsidiary processing logic arranged to perform tasks on behalf of the main processing logic, in alternative embodiments there may be a plurality of such subsidiary processing logic units provided within the apparatus, each of which may be allocatable various tasks by the main processing logic. In such embodiments, it is possible that a separate memory management unit may be provided for each such subsidiary processing logic. However, in an alternative embodiment a single such memory management unit is shared between the plurality of subsidiary processing logic units.

Viewed from a second aspect, the present invention provides a method of controlling access to memory in a data processing apparatus comprising main processing logic for executing a sequence of instructions in order to perform a process and subsidiary processing logic for performing at least part of said process on behalf of the main processing logic, the method comprising the steps of: (a) defining a portion of said memory to be allocated memory accessible to the subsidiary processing logic when performing said at least part of said process; (b) programming a memory management unit under control of the main processing logic; (c) using the memory management unit to control access to the allocated memory by the subsidiary processing logic, such that for an access request issued by the subsidiary processing logic relating to the allocated memory, the memory management unit produces in dependence on the programming performed at said step (b) a memory address and one or more associated memory attributes identifying one or more properties of the allocated memory at that memory address.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
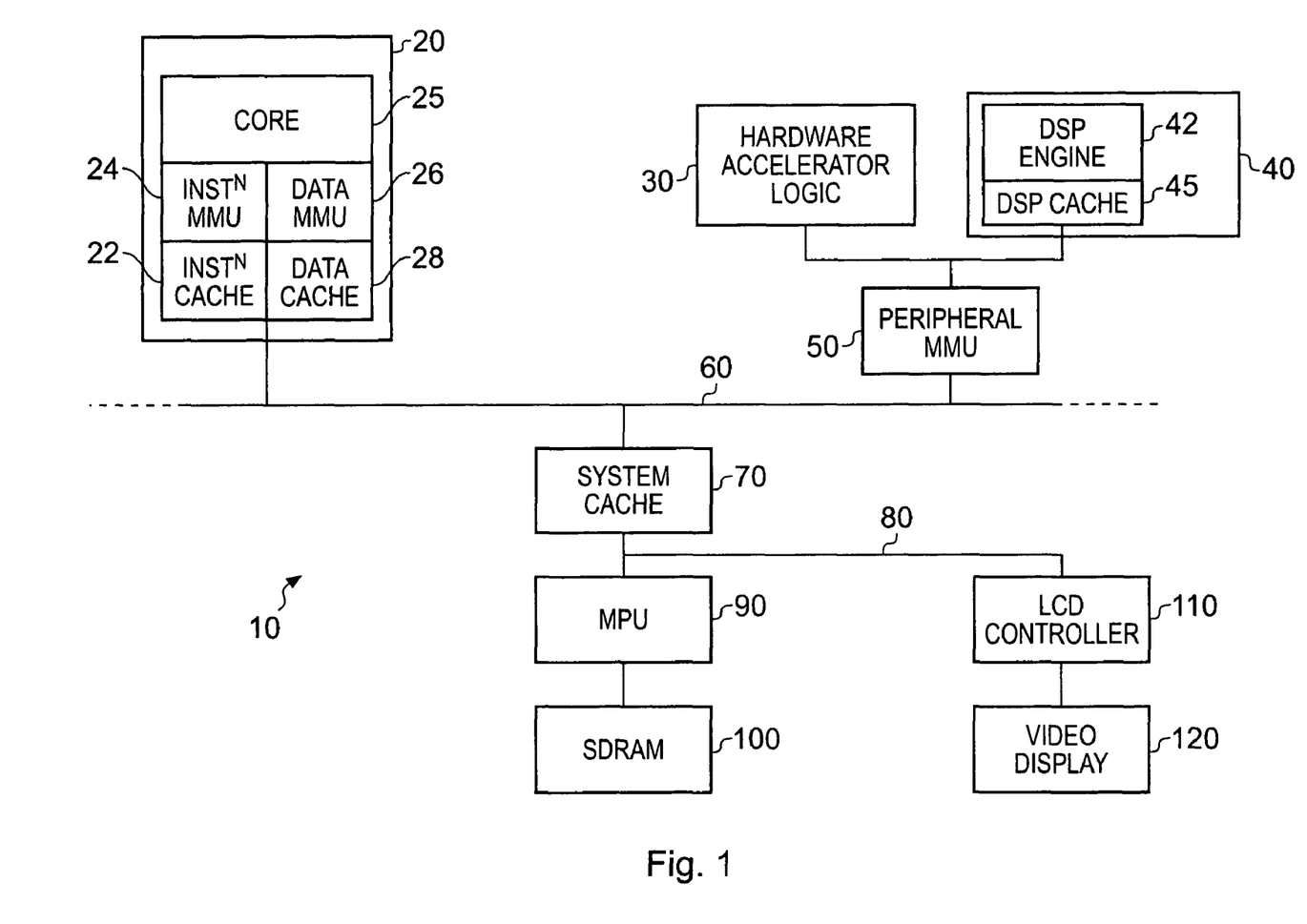
FIG. 1 is a block diagram of a data processing apparatus in accordance with one embodiment of the present invention.

FIG. 1 is a block diagram of a data processing apparatus in accordance with one embodiment of the present invention. A main processing unit 20 is provided having a processor core 25 for executing sequences of instructions. The instructions required to be executed can be retrieved by the core 25 from the memory 100, in this instance an SDRAM, through the issuance of appropriate access requests to the locations in memory 100 containing the required instructions. Access requests for instructions are passed via an internal instruction memory management unit (MMU) 24, which is responsible for performing predetermined access control functions, for example determining the physical address corresponding to a virtual address specified by the access request, and resolving access permission rights, such as whether the memory address is accessible in supervisor mode, user mode, etc, and region attributes, such as whether the instruction at that address is cacheable or bufferable, etc. Cacheable instructions accessed in such a manner will typically be stored in the internal instruction cache 22, from where they can more quickly be accessed by the core 25 if required again.

The data required when executing the sequence of instructions can in a similar manner be retrieved from the memory 100 through the issuance of appropriate data access requests, and for such data access requests, the data MMU 26 will, in a similar manner to the instruction MMU 24, perform predetermined access control functions, more particularly for determining the physical address corresponding to any specified virtual address, and for resolving access permission rights and determining region attributes. Any cacheable data accessed in such a manner can be stored in the data cache 28 to allow quicker access to that data if required again.

Whilst in FIG. 1 separate MMUs 24, 26 and separate caches 22, 28 are shown for the instructions and data, it will be appreciated that in alternative embodiments a single MMU and cache may be provided for storing both instructions and data. The internal cache 22, 28 provided within the main processing unit 20 is often referred to as a level one cache.

The main processing unit 20 is coupled to a number of subsidiary processing units 30, 40 via a bus 60, a peripheral memory management unit (MMU) 50 being interposed between the bus 60 and the subsidiary processing units 30, 40. In the particular example illustrated in FIG. 1, the subsidiary processing units consists of a hardware accelerator logic unit 30 to which the main processing unit 20 can delegate certain video processing tasks, and a digital signal processor (DSP) 40 to which the main processing unit may delegate certain digital signal processing tasks such as filtering, speech recognition, image enhancement, etc. In the example illustrated in FIG. 1, the DSP 40 consists of the DSP engine 42 used to perform the required tasks, and a DSP cache 45 in which data required by the DSP engine 42 can temporarily be stored.

To enable the subsidiary processing logic units 30, 40 to undertake certain tasks on behalf of the main processing logic 20, those subsidiary processing units must be given access to the required data sets that need processing. In the embodiment of FIG. 1, this is achieved by the main processing logic defining a portion of shared memory, and providing the ability to allow data of that shared memory to be stored in a system cache 70 which forms a level two cache and is shared between the main processing unit 20 and the subsidiary processing units 30, 40. When the main processing unit 20 issues an access request, it is arranged to associate with that access request a cache attribute identifying how the cache should handle data the subject of the access request. The cache attribute can identify for each level of cache how that level of cache should handle data the subject of the access request. The cache attribute may hence identify for each level of cache for the access in question whether that level of cache should employ a write through policy (where at the time the cache is updated that update is also propagated on to a further level of cache or to memory), or employ a write back policy (where at the time the cache is updated the update is not propagated on, but instead is only propagated on when the cache line is ultimately evicted from the cache).

In one particular example, when handling data that is to be shared with one or more of the subsidiary processing logic units 30, 40, the main processing unit may issue a cache attribute that indicates that the level one cache should employ a write through policy and the level two cache 70 should employ a write back policy. This will ensure that any updates made by the core 25 will immediately be replicated in the system cache 70, and hence will be available for access by the subsidiary processing units 30, 40.

One problem when utilising such a system cache 70 to share data between the main processing unit and the subsidiary processing units 30, 40 is ensuring that the subsidiary processing units 30, 40 also cause appropriate updates to be made to the system cache 70 when they update data. Typically, a subsidiary processing unit such as the hardware accelerator logic 30 or the DSP logic 40 may not be arranged to issue a cache attribute signal with its access requests. Further, even if such a subsidiary processing unit is arranged to issue a cache attribute signal, a difficulty that would arise would be ensuring that that subsidiary processing unit was issuing appropriate cache attribute signals to ensure system level cache coherency within the data processing apparatus 10, i.e. to ensure that each of the processing units 20, 30, 40 when issuing an access request for a particular data value will see the same version of that data value.

To address this issue, in the embodiment of FIG. 1 a peripheral MMU 50 is provided for handling access requests issued by either of the subsidiary processing units 30, 40. The peripheral MMU 50 is programmed by the main processing unit 20 via the bus 60 such that for an access request issued by either of the subsidiary processing units 30, 40, the peripheral MMU 50 is arranged to assert an appropriate cache attribute on to the bus 60. In particular, the main processing unit 20 is arranged to define in memory 100 a number of different page tables, and to associate with one of those page tables each process that may be allocated to one of the subsidiary processing units 30, 40. Each page table contains one or more descriptors, each descriptor defining for an associated address range access control information which can be used by the peripheral MMU 50 to generate an appropriate access request including the required cache attribute. In one embodiment, a descriptor may be provided for each 4 Kbyte page boundary in memory. More details of the operation of the peripheral MMU will be provided later with reference to the FIGS. 2 to 5.

In the embodiment illustrated in FIG. 1, the main processing unit 20 is also arranged to operate at a plurality of different security levels. More particularly, the main processing logic is operable in a plurality of modes, and either a secure domain or a non-secure domain, the plurality of modes including at least one non-secure mode being a mode in the non-secure domain, and at least one secure mode being a mode in the secure domain. In a non-secure mode, the main processing logic is operable under the control of a non-secure operating system, whilst in a secure mode the main processing logic is operable the control of a secure operating system. When the main processing unit is executing a program in a secure mode, the program has access to secure data which is not accessible when the main processing unit is operating in a non-secure mode.

When operating in such embodiments, the main processing logic 20 is arranged to issue in association with any access request a protection attribute identifying whether the access request pertains to the secure domain or the non-secure domain. Such a protection attribute will also typically contain other access permission information, such as whether the access is performed in user mode or supervisor mode, whether the access is a read or a write operation, etc.

A memory protection unit (MPU) 90 is provided to police accesses to memory 100, the MPU 90 being aware of the-partitioning of the physical memory between secure regions containing secure data and non-secure regions containing non-secure data. In particular, this partitioning is programmed by the main processing unit when operating in a secure mode. The partitioning may in one embodiment be dynamically re-allocated by the main processing unit if required. The MPU then references this partitioning information when it receives an access request and determines with reference to the protection attribute associated with the access request whether the access can take place. In particular, if the protection attribute indicates that the access request pertains to the non-secure domain, the MPU 90 prevents access to any secure data within the memory 100. For the interested reader, more details of the operation of a data processing apparatus having a secure domain and a non-secure domain are provided in the UK patent application 2 396 034.

The LCD controller 110 is arranged to retrieve data from memory 100 for displaying on the video display 120. If the LCD controller 110 is "domain aware", it will be arranged to issue a protection attribute in association with any access request it issues over path 80 to the memory 100, and the MPU 90 will hence effectively police accesses made by the LCD controller 110 to ensure that it only gets access to secure data when operating in a secure domain. If the LCD controller 110 is not domain-aware, then it will by definition be operating in a non-secure domain, and the MPU 90 will prevent access to any secure data within the memory 100 by the LCD controller 110.

However, when sharing data between the main processing unit 20 and one or other of the subsidiary processing logic units 30, 40, this has the potential to expose system level security issues. In the general case, some trusted, i.e. secure, data may need to be shared between the processing units 20, 30, 40, whilst some trusted data will be private to particular processing units 20, 30, 40. It needs to be ensured that private trusted data of one processing unit cannot be read by another processing unit, for example that private secure data of processing unit 30 is not accessed by processing unit 40, etc. The MPU approach 90 to policing accesses to memory 100 will be too limiting for the general case.

To address this issue, the peripheral MMU 50 is again used, and in particular the main processing logic 20 is arranged to define in the descriptors of the page tables not only appropriate cache attributes but also appropriate protection attributes. This ensures that for any access request issued by the subsidiary processing logic 30, 40, the peripheral MMU will assert over the bus 60 a protection signal that has in effect been generated under the control of the main processing unit 20.

More particularly, the page tables are preferably defined by the main processing unit 20 when operating in a secure mode, and accordingly this ensures that the protection attributes output by the peripheral MMU 50 in association with any access requests generated by the subsidiary processing units 30, 40 are generated under the control of the secure operating system of the main processing unit 20. By this approach, the page tables can be defined so as to provide effective process isolation, by binding the data regions of particular descriptors with specific applications.

Figure 2:
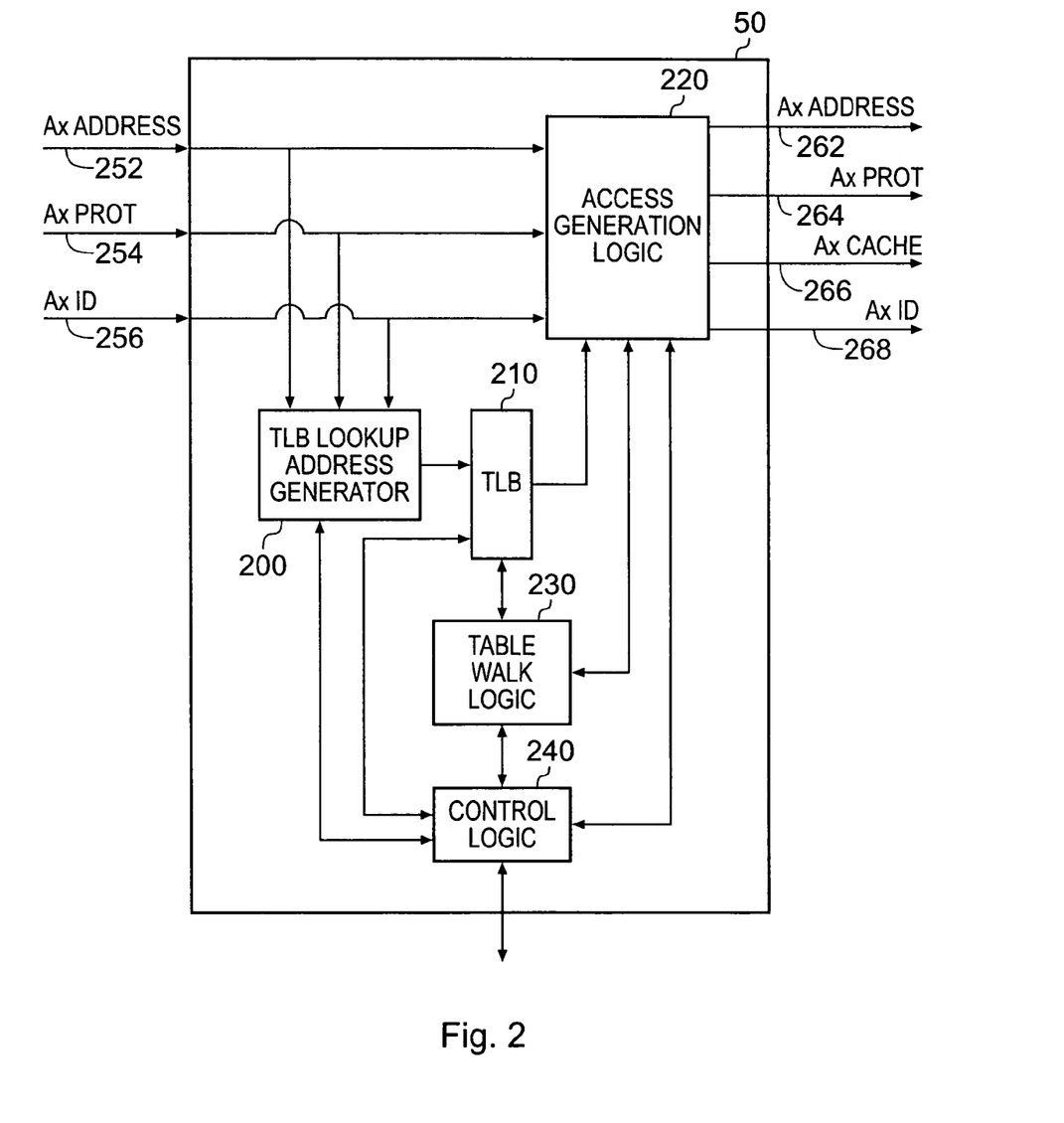
FIG. 2 is a block diagram illustrating in more detail the peripheral MMU of FIG. 1 in accordance with one embodiment of the present invention.

FIG. 2 is a block diagram illustrating in more detail logic provided within the peripheral MMU 50. The peripheral MMU 50 is arranged to receive an access request issued by one of the subsidiary processing logic units 30, 40, this access request including a virtual address 252, a device identifier 256, and any protection attribute 254 issued by the subsidiary processing logic unit. These signals are received by TLB lookup address generation logic 200 which is operable to generate a lookup address for accessing the table lookaside buffer (TLB) 210.

If each of the subsidiary processing logic units 30, 40 can only be allocated one particular task on behalf of the main processing logic unit, then the device identifier 256 is sufficient to identify the process to which the access request relates. However, if more than one process may be allocated to a particular subsidiary processing logic unit 30, 40, then the device identifier 256 of that subsidiary processing logic is not in itself sufficient, and in such instances the device identifier signal 256 received by the peripheral MMU 50 will be supplemented with some additional information indicative of the process, such that a unique identifier 256 is received pertaining to each process. The processing unit responsible for supplementing the device identifier will be dependent on the implementation. For example, for some subsidiary processing units, the main processing unit may be responsible for any such supplementing, whilst for other subsidiary processing units, for example a DSP, either the main processing unit or the DSP may be able to supplement the device identifier.

Figure 3:
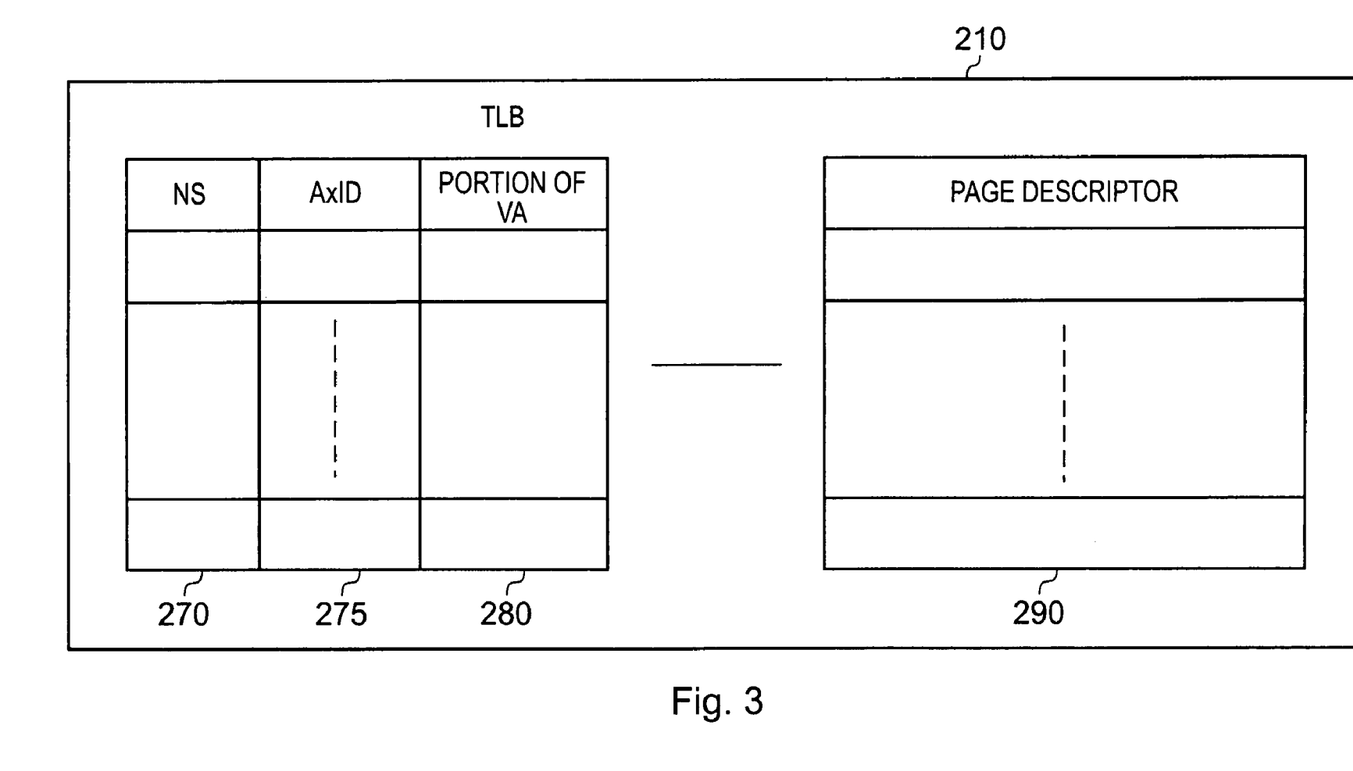
FIG. 3 illustrates the structure of the TLB of FIG. 2 in accordance with one embodiment of the present invention.

The structure of the TLB 210 is shown in FIG. 3. In particular, the TLB 210 is arranged as a CAM structure containing a number of entries. The address produced by the TLB lookup address generator 200 consists of a combination of the received protection signal 254, the device ID signal 256 (supplemented by process information as necessary) and an upper portion of the virtual address 252. Each entry 290 in the TLB 210 has associated therewith a corresponding address consisting of a non-secure identifier bit 270 (corresponding to the protection attribute), a device identifier value 275 and a virtual address portion value 280. If the address issued by the TLB lookup address generator 200 matches any of the addresses in the TLB 210, then the corresponding page descriptor 290 is output to access generation logic 220.

If there is a miss in the TLB 210, i.e. no match is found between the generated address and one of the addresses stored in association with the TLB entries, then a check is performed to determine whether there is a valid page table for the required access. As will be discussed in more detail later, this is determined with reference to the protection value 254 and the device identifier 256 as supplemented with any required process information. Assuming there is a valid page table, then the table walk logic 230 is used to perform an access to memory 100 via the access generation logic 220 in order to retrieve the relevant descriptor from the appropriate page table and store that descriptor into the TLB, whereafter that descriptor will be output to the access generation logic 220 for use in generating the required access request for the access request received from the subsidiary processing unit 30, 40.

Each descriptor will contain information used to generate a physical address 262 from the associated virtual address 252, and the information required to generate appropriate protection 264 and cache attributes 266 for outputting in association with the access request. As also shown in FIG. 2, the device identifier will also be output as a signal 268 from the access generation logic 220. Typically, the device identifier output as signal 268 will be the original device identifier rather than any supplemented value used in the TLB lookup process.

As also shown in FIG. 2, control logic 240 is provided which can be accessed by the main processing logic via the bus 60 in a secure mode of operation in order to program the various elements 200, 210, 220, 230 of the MMU 50. In particular, once the main processing unit 20 has defined in memory 100 the required page tables, it is arranged to program the MMU to identify to the MMU the base addresses for the various page tables, and the combinations of protection attribute signal 254 and device identifier signal 256 that are required in order to access any particular page table.

Figure 4:
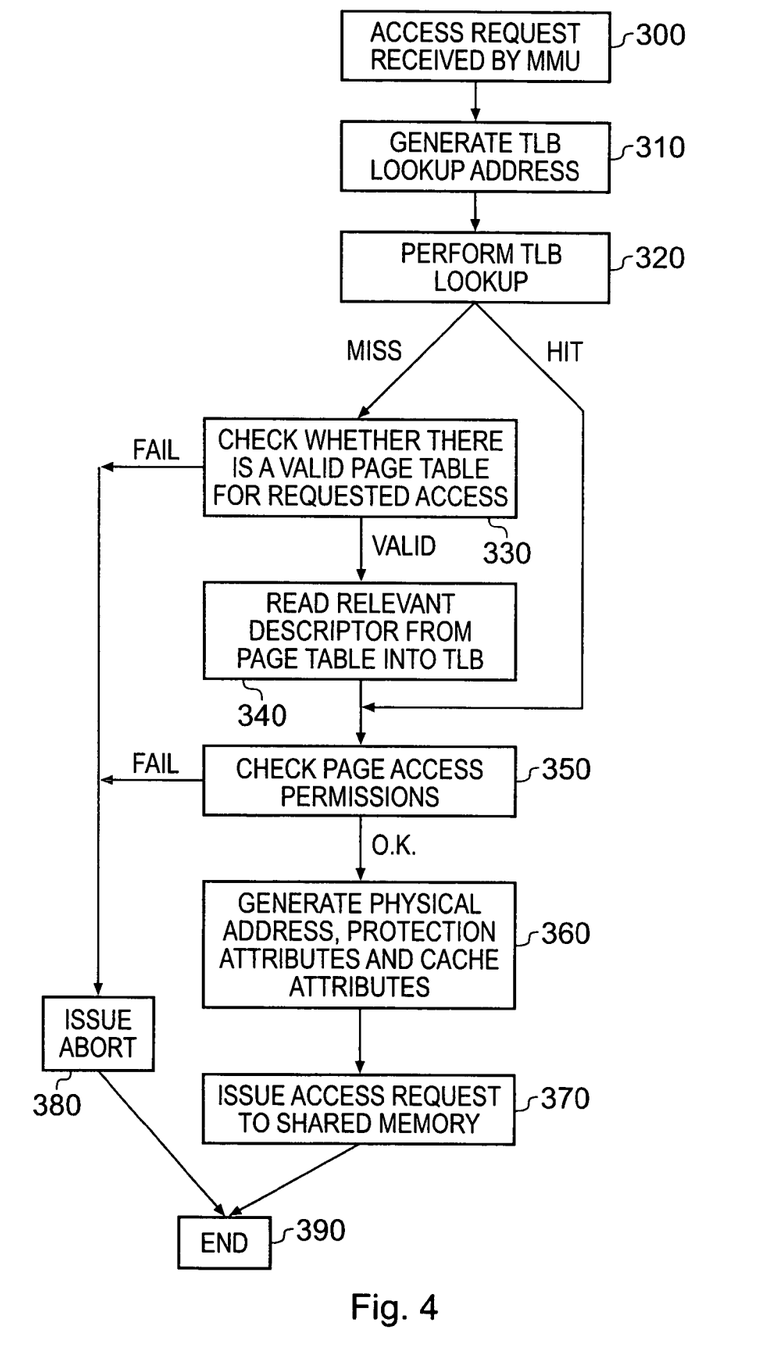
FIG. 4 is a flow diagram illustrating the operation of the peripheral MU of FIG. 1 in accordance with one embodiment of the present invention.

More details of the operation of the peripheral MMu 50 will now be provided with reference to the flow diagram of FIG. 4. At step 300, an access request is received by the MMU 50, whereafter at step 310 the TLB lookup address generator 200 generates a TLB lookup address in the manner described earlier with reference to FIG. 3. A TLB lookup is then performed at step 320.

If a miss in the TLB occurs, then the process branches to step 330, where the MMU 50 checks whether there is a valid page table for the requested access. In particular, the received protection 254 and identifier 256 signals are evaluated in order to determine whether that combination of signals is associated with a valid base address of a page table. If not, then the process branches to step 380, where an abort signal is issued after which the process ends at step 390.

However, assuming that there is a valid page table for the requested access, then the process proceeds to step 340, where the table walk logic 230 causes the access generation logic 220 to issue an appropriate access request to memory 100 in order to retrieve the required descriptor from the appropriate page table, and to store that descriptor into one of the entries of the TLB 210.

The process then proceeds to step 350, or proceeds directly to step 350 from step 320 if a hit was previously obtained in the TLB 210. At step 350, page access permissions are checked. In particular, each descriptor will contain information identifying whether the page of data associated with that descriptor is accessible in supervisor mode, user mode, etc, and whether it is accessible for read operations, write operations, etc and this is checked against the associated information of the access request, which will typically be contained as part of the protection attribute (AxPROT signal) issued with the request.

If this reveals that the access fails the access permission requirements of the memory page, then the process branches to step 380, where an abort is issued, after which the process ends at step 390.

However, assuming that the page access permissions are passed at step 350, then the process proceeds to step 360, where the access generation logic 220 is arranged to produce a physical address 262, a protection attribute 264 and a cache attribute 266 based on the originally provided information of the access request and the information provided in the descriptor. In addition, as shown in FIG. 2, the device identifier 268 is typically also output by the access generation logic 220. Then, at step 370, the access request is issued to shared memory, where it will initially be received by the system cache 70. The process then ends at step 390.

Figure 5:
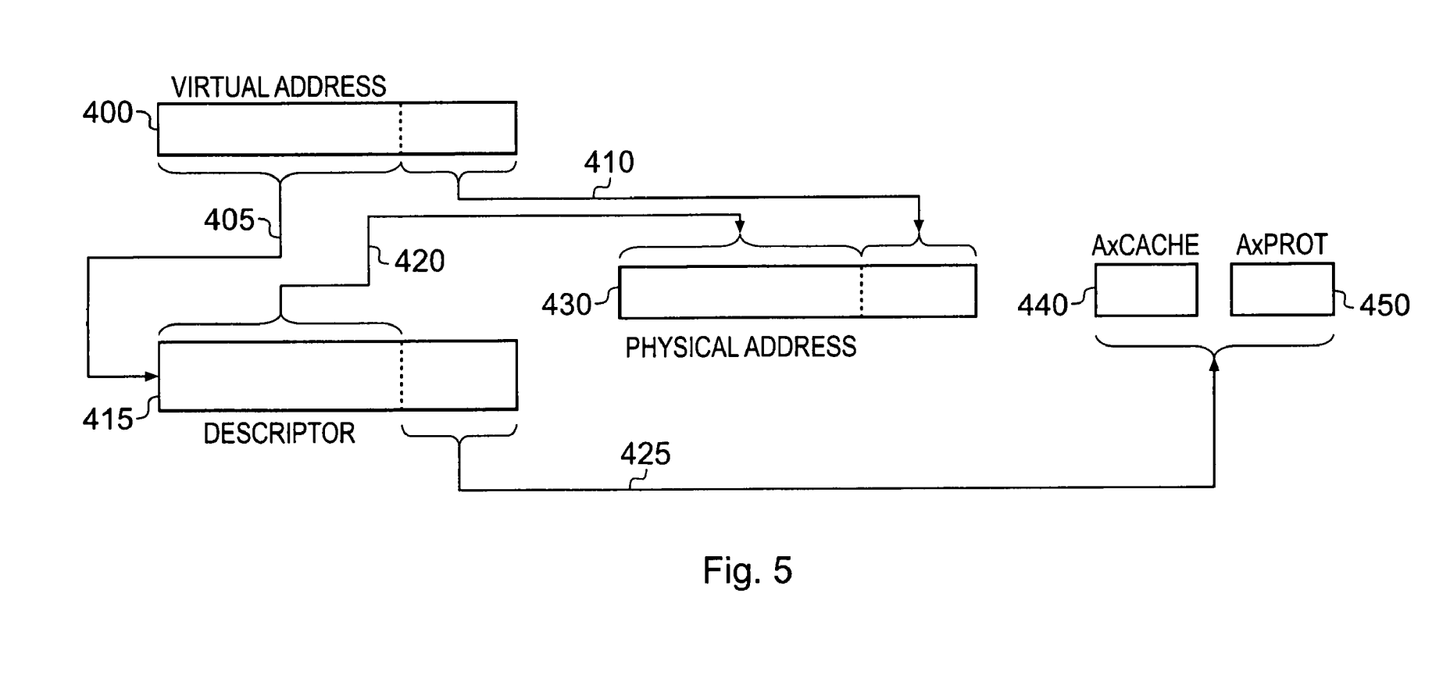
FIG. 5 is a diagram schematically illustrating the relationship between a virtual address, a descriptor, a physical address, and cache and protection attributes in accordance with one embodiment of the present invention.

FIG. 5 is a diagram schematically illustrating how the physical address, cache and protection attributes are generated by the access generation logic 220 based on the received information. As shown in FIG. 5, an upper portion 405 of the virtual address 400 is used to identify an appropriate descriptor 415 in a page table. As discussed earlier, the actual page table itself is selected based on the combination of the protection signal 254 and device identifier signal 256 received from the subsidiary processing logic 30, 40. In one embodiment, this descriptor then includes an upper portion 420 which is used to generate the upper portion of the physical address 430 corresponding to the virtual address 400. In the embodiment illustrated in FIG. 5, the lower portion of the physical address 430 is formed by the lower portion 410 of the virtual address 400.

The remaining portion 425 of the descriptor 415 is used to generate a cache attribute 440 and a protection attribute 450. In one embodiment, these two attributes are directly encoded in the portion 425 of the descriptor 415.

Figure 6:
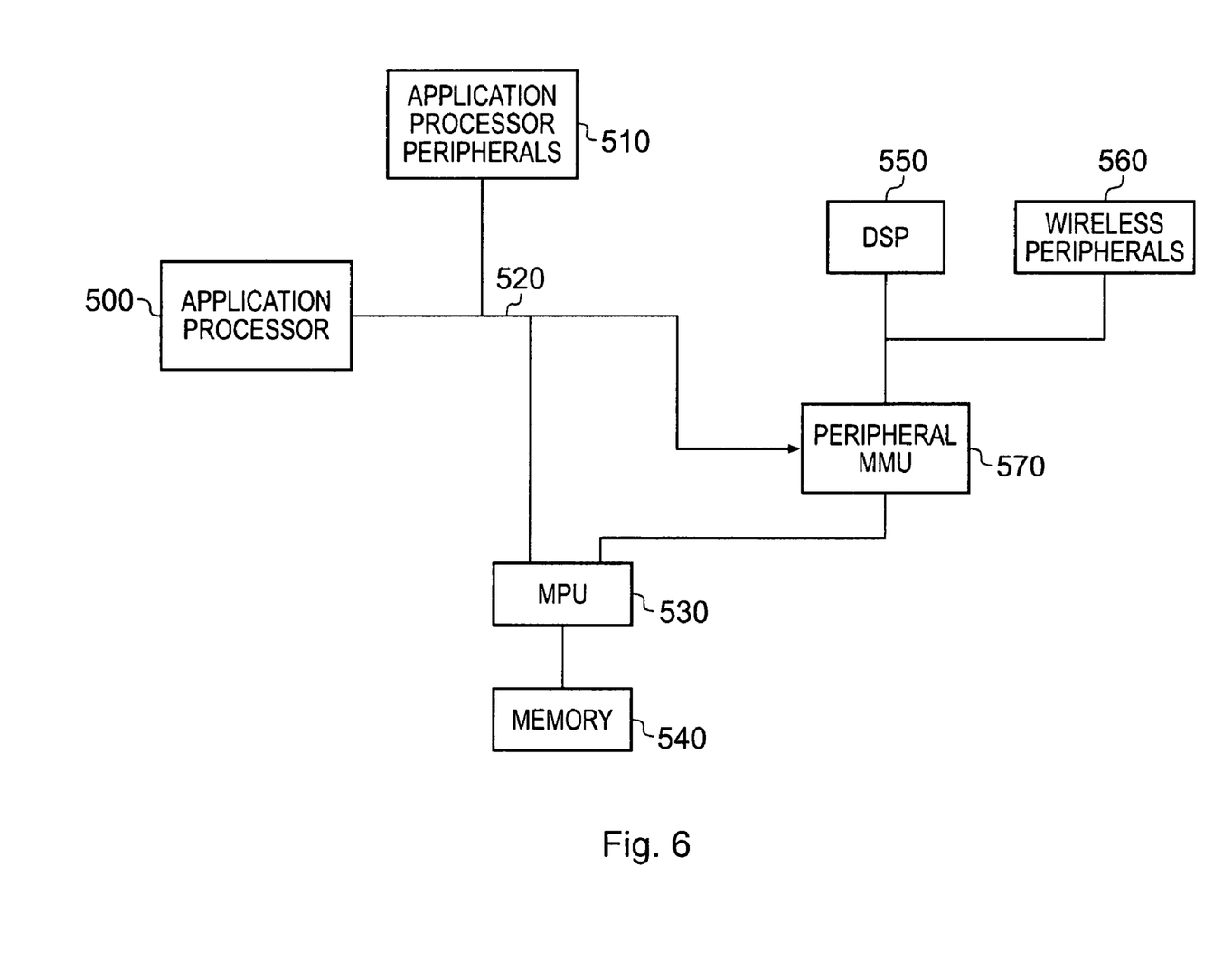
FIG. 6 is a block diagram of a data processing apparatus in accordance with a second embodiment of the present invention.

A shared system cache 70 as shown in FIG. 1 is not a requirement of all embodiments of the present invention. In particular, FIG. 6 shows an alternative embodiment where there is no shared system cache. In this embodiment, an application processor 500 is coupled via a bus 520 with various application processor peripheral devices 510 and a memory 540. As in the FIG. 1 embodiment, an MPU 530 is provided to police accesses to the memory 540 to ensure that secure data is not accessed by an application running in the non-secure domain.

Also provided within the apparatus is a digital signal processor 550 and one or more wireless peripheral devices 560, and both the DSP 550 and wireless peripheral devices 560 may be allocated certain tasks on behalf of the application processor 500.

In this embodiment, it is envisaged that when a particular task is allocated from the application processor 500 to either the DSP 550 or the wireless peripheral devices 560, then a portion of memory in the physical address space will be allocated to the subsidiary processing unit 550, 560 for that purpose, and during the time that the subsidiary processing logic is performing the task, the application processor 500 will not have access to that memory.

As in the FIG. 1 embodiment, a peripheral MMU 570 is provided for generating the required access requests to memory 540 based on access requests received by it from the DSP 550 or wireless peripheral devices 560. Further as with the FIG. 1 embodiment, the peripheral MMU 570 is programmed by the application processor 500 when operating in a secure mode in order to identify the various page tables, and indicate which page table should be referenced by which processes.

Figure 7:
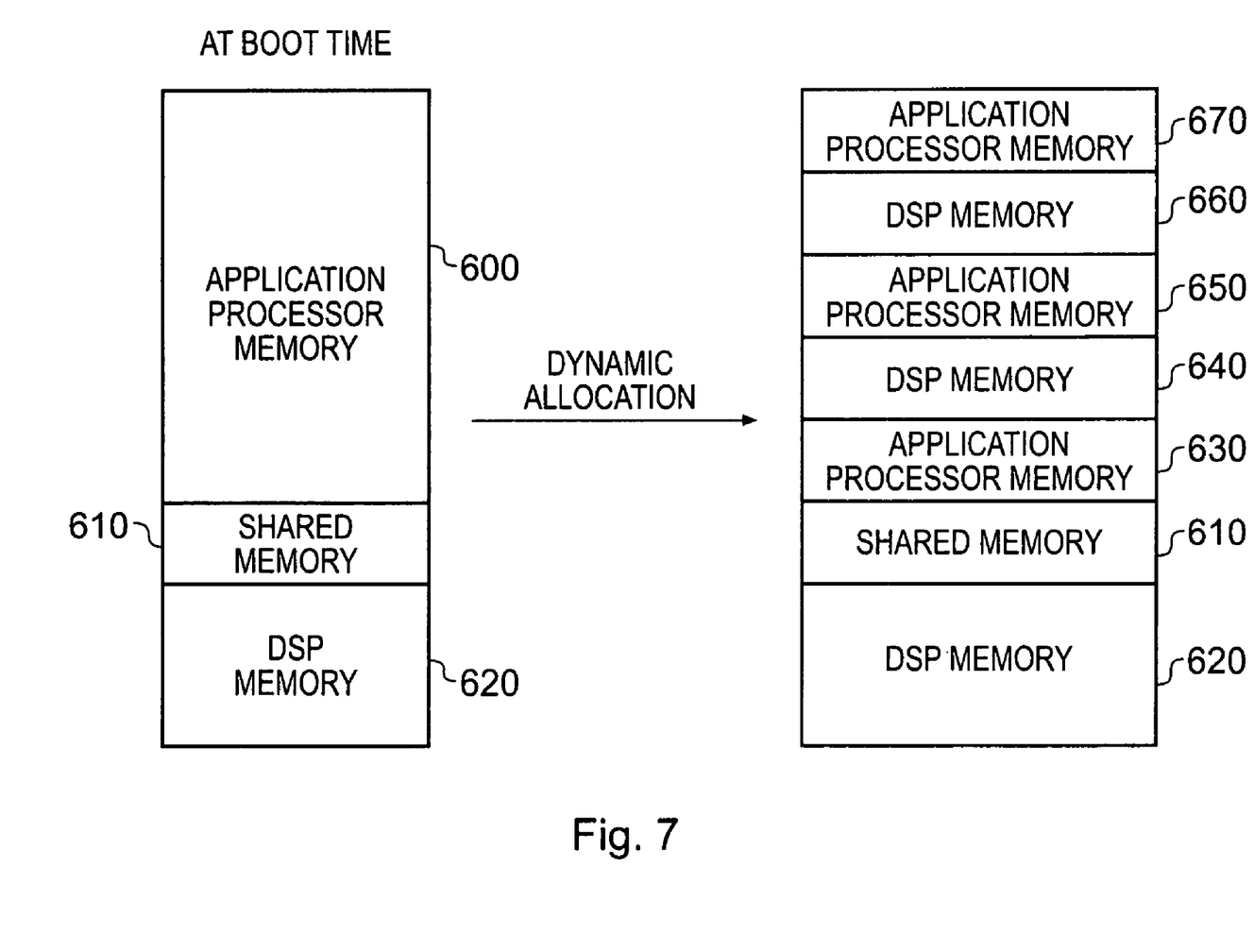
FIG. 7 is a diagram schematically illustrating the dynamic allocation of memory within the data processing apparatus of FIG. 6.

This enables dynamic allocation of memory resources, as shown in FIG. 7. More particularly, at boot time, the physical memory 540 may be partitioned into three regions, namely a DSP memory region 620, an application processor memory region 600, and a shared memory region 610. This shared memory region 610 is a pool of contiguous, physically address memory.

At some later point during execution of a particular process, the application processor 500 may wish to allocate a particular part of that process to the DSP 550, at which point it can dynamically allocate two memory regions 640 and 660 as being DSP memory regions. The remaining regions 630, 650, 670 of the original application processor memory region 600 are retained as application processor memory regions. However, during the time that the DSP 550 is performing a task on behalf of the application processor 500, the regions 640 and 660 cannot be accessed by the application processor.

It will be appreciated from the above description that the embodiments of the present invention enable access to memory to be controlled such that a peripheral MMU controlling accesses by subsidiary processing logic units will issue in association with a memory address one or more associated memory attributes whose values are controlled via appropriate programming of that peripheral MMU by a main processing unit. This, for example, ensures that system level cache coherency can be maintained in a system where a system cache is shared between the main processing unit and the subsidiary processing units. In addition, by way of another example, it ensures that system level security issues can be managed by controlled generation of appropriate protection attributes in association with access requests issued by the subsidiary processing units.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   main processing logic operable to execute a sequence of instructions in order to perform a process;
   subsidiary processing logic operable to perform at least part of said process on behalf of the main processing logic;
   a memory accessible by the main processing logic when performing said process, the main processing logic defining a portion of said memory to be allocated memory accessible to the subsidiary processing logic when performing said at least part of said process;
   a memory management unit, programmable by the main processing logic, for controlling access to the allocated memory by the subsidiary processing logic, the main processing logic being operable to program the memory management unit such that for an access request issued by the subsidiary processing logic relating to the allocated memory, the memory management unit produces a memory address and one or more associated memory attributes identifying one or more properties of the allocated memory at that memory address, wherein the main processing logic is operable to produce a set of tables, each table in the set containing a number of descriptors, each descriptor defining for an associated address range access control information from which said memory address and one or more associated memory attributes can be derived, the main processing logic being further operable to program the memory management unit to identify the location of the set of tables and circumstances in which each table should be used.

2. A data processing apparatus as claimed in claim 1, wherein the main processing logic is operable to perform a plurality of processes, and the set of tables comprises a table for each process that the subsidiary processing logic may perform a part of on behalf of the main processing logic.

3. A data processing apparatus as claimed in claim 2, wherein the subsidiary processing logic is operable to perform at least part of multiple processes on behalf of the main processing logic, and in association with the access request issued by the subsidiary processing logic the memory management unit is operable to receive an indication of a process to which the access request relates, the memory management unit being operable to select based on said indication one of said tables from the set.

4. A data processing apparatus as claimed in claim 1, wherein the set of tables are produced, and the memory management unit is programmed, by the main processing logic when operating in a privileged mode.

5. A data processing apparatus as claimed in claim 1, wherein the main processing logic is operable in a plurality of modes and a plurality of domains, said plurality of domains comprising a secure domain and a non-secure domain, said plurality of modes including at least one non-secure mode being a mode in the non-secure domain, and at least one secure mode being a mode in the secure domain, said main processing logic being operable such that when executing a program in a secure mode said program has access to secure data which is not accessible when said main processing logic is operating in a non-secure mode, and wherein in at least one non-secure mode the main processing logic is operable under the control of a non-secure operating system and in said at least one secure mode the main processing logic is operable under the control of a secure operating system, the secure operating system being operable to produce the set of tables, and program the memory management unit, when the main processing logic is operating in a privileged secure mode.

6. A data processing apparatus comprising:
   main processing logic operable to execute a sequence of instructions in order to perform a process;
   subsidiary processing logic operable to perform at least part of said process on behalf of the main processing logic;
   a memory accessible by the main processing logic when performing said process, the main processing logic defining a portion of said memory to be allocated memory accessible to the subsidiary processing logic when performing said at least part of said process;
   a memory management unit, programmable by the main processing logic, for controlling access to the allocated memory by the subsidiary processing logic, the main processing logic being operable to program the memory management unit such that for an access request issued by the subsidiary processing logic relating to the allocated memory, the memory management unit produces a memory address and one or more associated memory attributes identifying one or more properties of the allocated memory at that memory address, wherein the allocated memory is cacheable memory, and the data processing apparatus further comprises a cache accessible by the main processing logic and the subsidiary processing logic and operable to store data associated with cacheable memory, the one or more associated memory attributes produced by the memory management unit comprising a cache attribute identifying how the cache should handle data which is the subject of the access request.

7. A data processing apparatus as claimed in claim 6, wherein the cache is one of a plurality of different levels of cache provided within the data processing apparatus, and the cache attribute identifies for each level of cache how that level of cache should handle data which is the subject of the access request.

8. A data processing apparatus as claimed in claim 7, wherein the plurality of different levels of cache are grouped into inner cache and outer cache, and the cache attribute identifies for the inner cache and for the outer cache how that cache should handle data which is the subject of the access request.

9. A data processing apparatus comprising:
main processing logic operable to execute a sequence of instructions in order to perform a process;
subsidiary processing logic operable to perform at least part of said process on behalf of the main processing logic;
a memory accessible by the main processing logic when performing said process, the main processing logic defining a portion of said memory to be allocated memory accessible to the subsidiary processing logic when performing said at least part of said process;
a memory management unit, programmable by the main processing logic, for controlling access to the allocated memory by the subsidiary processing logic, the main processing logic being operable to program the memory management unit such that for an access request issued by the subsidiary processing logic relating to the allocated memory, the memory management unit produces a memory address and one or more associated memory attributes identifying one or more properties of the allocated memory at that memory address, wherein a plurality of different security levels are defined and the one or more memory attributes associated with the memory address comprises a protection attribute identifying a security level required to access the memory location identified by that memory address, wherein the main processing logic is operable in a plurality of modes and a plurality of domains, said plurality of domains comprising a secure domain and a non-secure domain, said plurality of modes including at least one non-secure mode being a mode in the non-secure domain, and at least one secure mode being a mode in the secure domain, said main processing logic being operable such that when executing a program in a secure mode said program has access to secure data which is not accessible when said main processing logic is operating in a non-secure mode, and said security levels being defined with respect to the plurality of modes and plurality of domains.

10. A method of controlling access to memory in a data processing apparatus comprising main processing logic for executing a sequence of instructions in order to perform a process and subsidiary processing logic for performing at least part of said process on behalf of the main processing logic, the method comprising the steps of:
(a) defining a portion of said memory to be allocated memory accessible to the subsidiary processing logic when performing said at least part of said process;
(b) programming a memory management unit under control of the main processing logic;
(c) using the memory management unit to control access to the allocated memory by the subsidiary processing logic, such that for an access request issued by the subsidiary processing logic relating to the allocated memory, the memory management unit produces in dependence on the programming performed at said step (b) a memory address and one or more associated memory attributes identifying one or more properties of the allocated memory at that memory address, further comprising the step of:
producing under control of the main processing logic a set of tables, each table in the set containing a number of descriptors, each descriptor defining for an associated address range access control information from which said memory address and one or more associated memory attributes can be derived; and
at said step (b), the memory management unit being programmed to identify the location of the set of tables and circumstances in which each table should be used.

11. A method as claimed in claim 10, wherein the main processing logic performs a plurality of processes, and the set of tables comprises a table for each process that the subsidiary processing logic may perform a part of on behalf of the main processing logic.

12. A method as claimed in claim 11, wherein the subsidiary processing logic performs at least part of multiple processes on behalf of the main processing logic, the method further comprising the steps of:
in association with the access request issued by the subsidiary processing logic, providing the memory management unit with an indication of a process to which the access request relates;
at said step (c), the memory management unit selecting based on said indication one of said tables from the set.

13. A method as claimed in claim 10, wherein the set of tables are produced, and the memory management unit is programmed, by the main processing logic when operating in a privileged mode.

14. A method as claimed in claim 10, wherein the main processing logic is operable in a plurality of modes and a plurality of domains, said plurality of domains comprising a secure domain and a non-secure domain, said plurality of modes including at least one non-secure mode being a mode in the non-secure domain, and at least one secure mode being a mode in the secure domain, said main processing logic being operable such that when executing a program in a secure mode said program has access to secure data which is not accessible when said main processing logic is operating in a non-secure mode, and security levels being defined with respect to the plurality of modes and plurality of domains, and wherein in said at least one non-secure mode the main processing logic operates under the control of a non-secure operating system and in said at least one secure mode the main processing logic operates under the control of a secure operating system, the secure operating system being operable to produce the set of tables, and program the memory management unit, when the main processing logic is operating in a privileged secure mode.

15. A method of controlling access to memory in a data processing apparatus comprising main processing logic for executing a sequence of instructions in order to perform a process and subsidiary processing logic for performing at least part of said process on behalf of the main processing logic, the method comprising the steps of:
(a) defining a portion of said memory to be allocated memory accessible to the subsidiary processing logic when performing said at least part of said process;
(b) programming a memory management unit under control of the main processing logic;
(c) using the memory management unit to control access to the allocated memory by the subsidiary processing logic, such that for an access request issued by the subsidiary processing logic relating to the allocated memory, the memory management unit produces in dependence on the programming performed at said step (b) a memory address and one or more associated memory attributes identifying one or more properties of the allocated memory at that memory address, wherein the allocated memory is cacheable memory, and the data processing apparatus further comprises a cache accessible by the main processing logic and the subsidiary processing logic and operable to store data associated with cacheable memory, the one or more associated memory attributes produced by the memory management unit at said step (c) comprising a cache attribute identifying how the cache should handle data which is the subject of the access request.

16. A method as claimed in claim 15, wherein the cache is one of a plurality of different levels of cache provided within the data processing apparatus, and the cache attribute identifies for each level of cache how that level of cache should handle data which is the subject of the access request.

17. A method as claimed in claim 16, wherein the plurality of different levels of cache are grouped into inner cache and outer cache, and the cache attribute identifies for the inner cache and for the outer cache how that cache should handle data which is the subject of the access request.

18. A method of controlling access to memory in a data processing apparatus comprising main processing logic for executing a sequence of instructions in order to perform a process and subsidiary processing logic for performing at least part of said process on behalf of the main processing logic, the method comprising the steps of:
  (a) defining a portion of said memory to be allocated memory accessible to the subsidiary processing logic when performing said at least part of said process;
  (b) programming a memory management unit under control of the main processing logic;
  (c) using the memory management unit to control access to the allocated memory by the subsidiary processing logic, such that for an access request issued by the subsidiary processing logic relating to the allocated memory, the memory management unit produces in dependence on the programming performed at said step (b) a memory address and one or more associated memory attributes identifying one or more properties of the allocated memory at that memory address, wherein a plurality of different security levels are defined and the one or more memory attributes produced in association with the memory address at said step (c) comprises a protection attribute identifying a security level required to access the memory location identified by that memory address, wherein the main processing logic is operable in a plurality of modes and a plurality of domains, said plurality of domains comprising a secure domain and a non-secure domain, said plurality of modes including at least one non-secure mode being a mode in the non-secure domain, and at least one secure mode being a mode in the secure domain, said main processing logic being operable such that when executing a program in a secure mode said program has access to secure data which is not accessible when said main processing logic is operating in a non-secure mode, and said security levels being defined with respect to the plurality of modes and plurality of domains.

* * * * *